United States Patent

[11] 3,566,911

[72] Inventor Benjamin R. Neier
East Wyatt Earp and Highway 50, Dodge City, Kans. 67801
[21] Appl. No. 815,659
[22] Filed Apr. 14, 1969
[45] Patented Mar. 2, 1971

[54] MOBILE UNIT FOR SELF-PROPELLED IRRIGATION SYSTEMS
7 Claims, 8 Drawing Figs.

[52] U.S. Cl. .................................................. 137/344
[51] Int. Cl. ........................................ B05b 9/02, E01h 3/02
[50] Field of Search .......................................... 137/344; 239/212, 213

[56] References Cited
UNITED STATES PATENTS

| | | | |
|---|---|---|---|
| 1,346,843 | 7/1920 | Ramen .......................... | 239/213 |
| 2,796,292 | 6/1957 | Maggart ....................... | 239/213 |
| 2,800,364 | 7/1957 | Dick et al. ..................... | 239/212X |
| 2,834,634 | 5/1958 | Johnson ....................... | 239/213X |
| 3,202,172 | 8/1965 | Bergeron et al. ............. | 137/344 |
| 3,355,109 | 11/1967 | Kane ............................ | 137/344X |
| 3,360,200 | 12/1967 | Purtell ......................... | 239/213 |
| 3,379,378 | 4/1968 | Kern ............................. | 239/212 |
| 3,394,729 | 7/1968 | Bower et al. ................. | 137/344 |
| 3,417,766 | 12/1968 | Purtell ......................... | 137/344 |
| 3,447,751 | 6/1969 | Wieck ......................... | 239/212 |

Primary Examiner—Samuel Scott
Attorney—Fishburn, Gold and Litman

ABSTRACT: A mobile unit for self-propelled irrigation systems having a plurality of mobile units wherein each mobile unit has an elongate frame, a yoke mounted on each end of the frame, a wheel rotatably mounted on each of the yokes, an elongate irrigation pipe has one end mounted on and extends transversely from one side of the frame, truss members supporting the irrigation pipe, and drive means operatively connected thereto for driving the mobile unit. The mobile units in the irrigation system are adapted to move relative to each other by a slip or expansion joint having one end of a slip joint pipe received in one end of a sleeve member mounted in the frame and one end of the irrigation pipe communicating with the other end of the sleeve member. A collar is mounted on the other side of the frame and has fluidtight seal means therein engaging an exterior surface of the slip joint pipe whereby the slip joint pipe can move relative to the frame. Movement limiting means extend between the other end of the slip joint pipe and the other side of the frame for maintaining the one end of the slip joint pipe within the sleeve member.

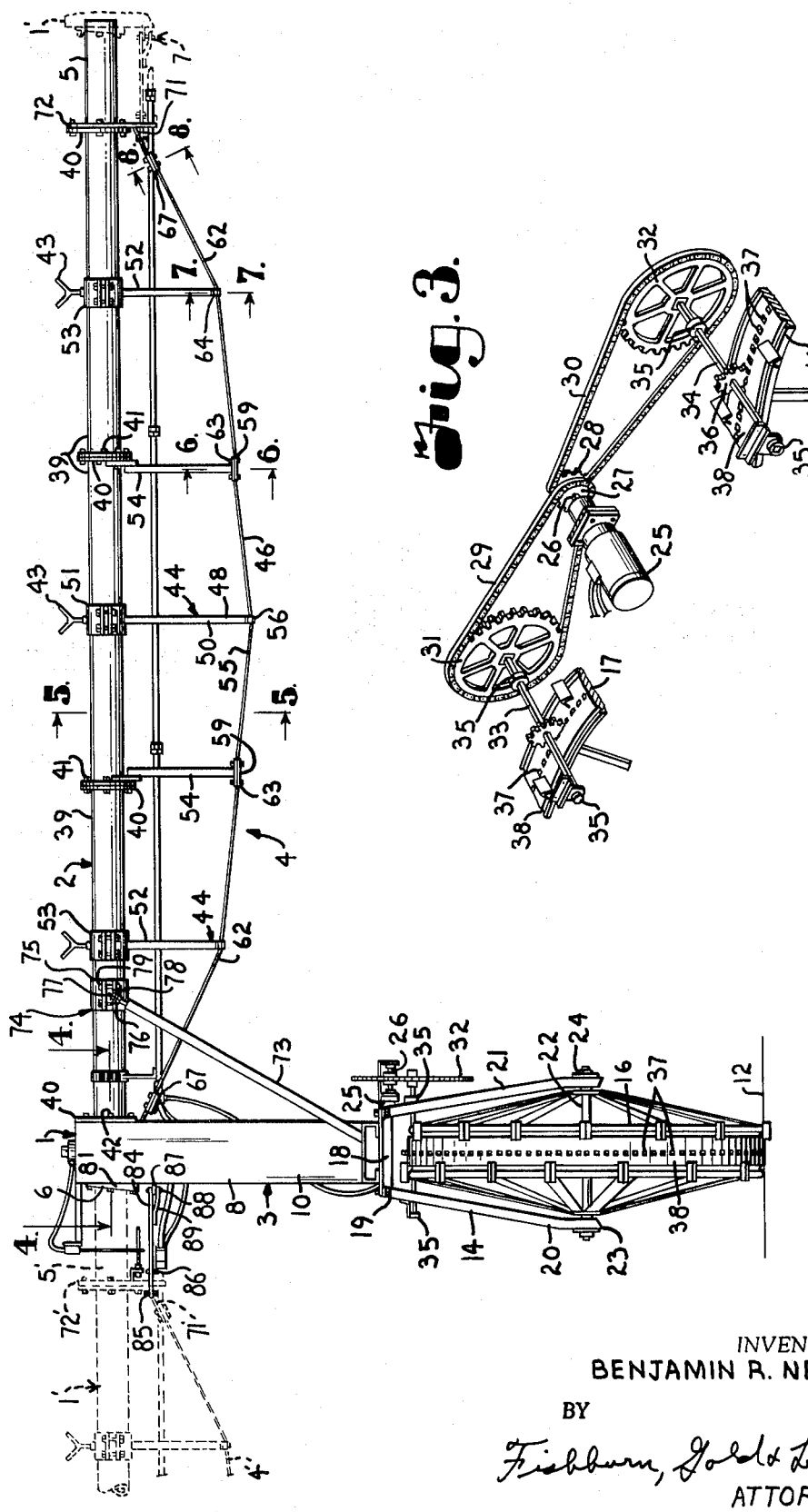

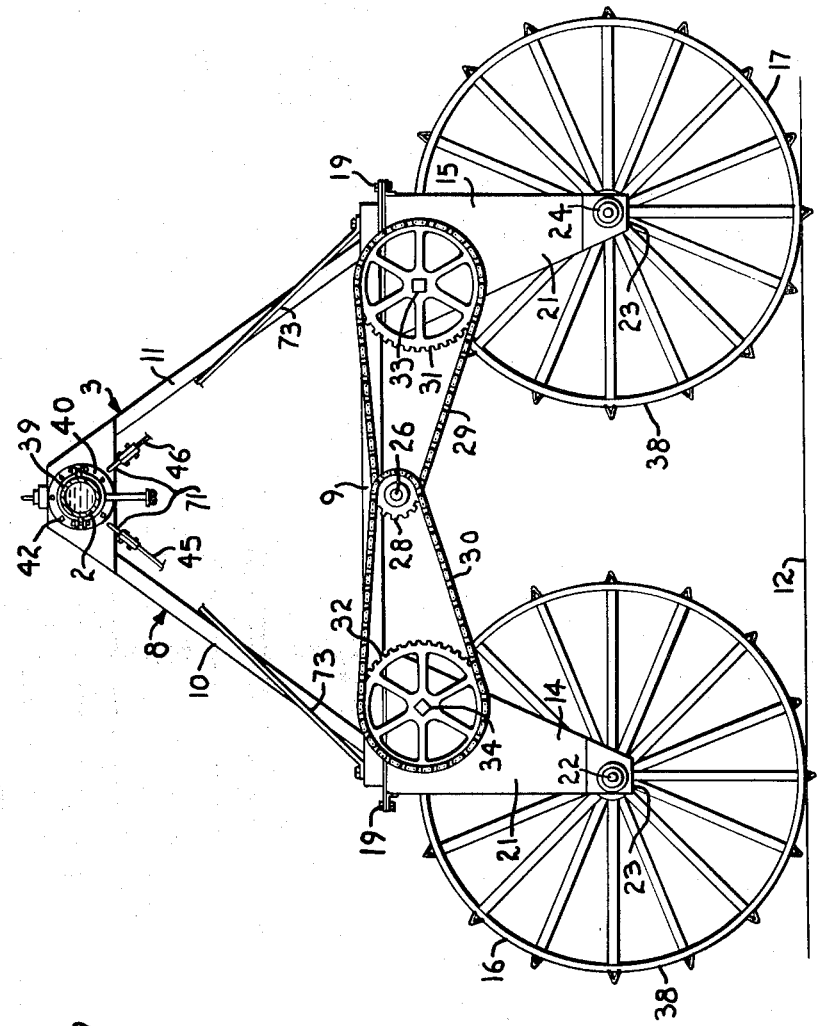
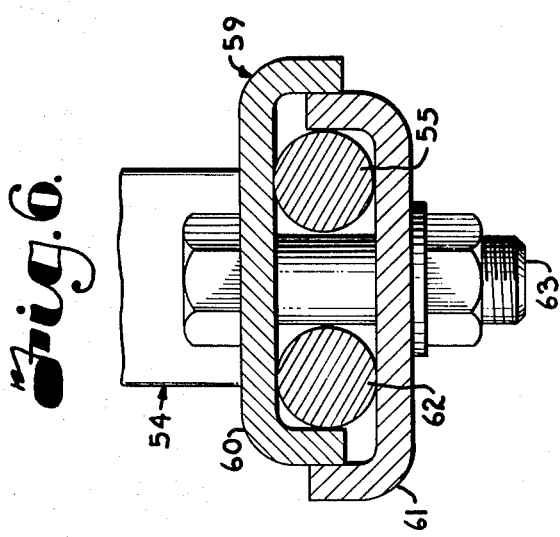

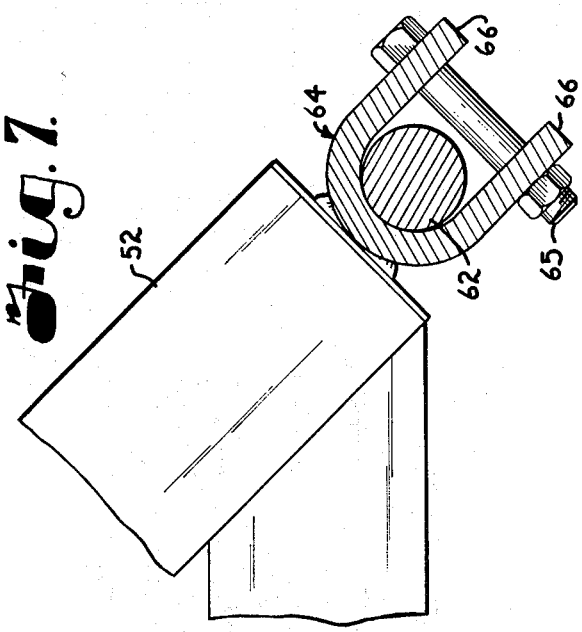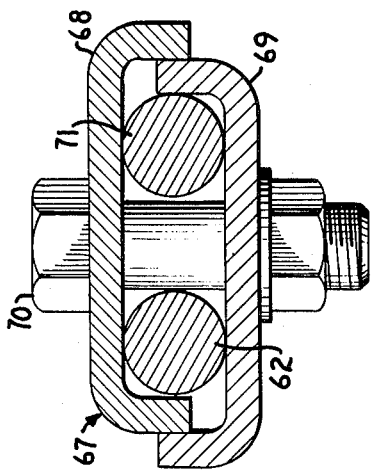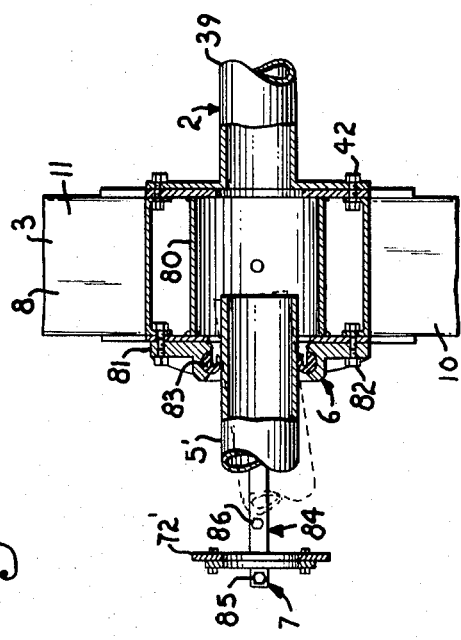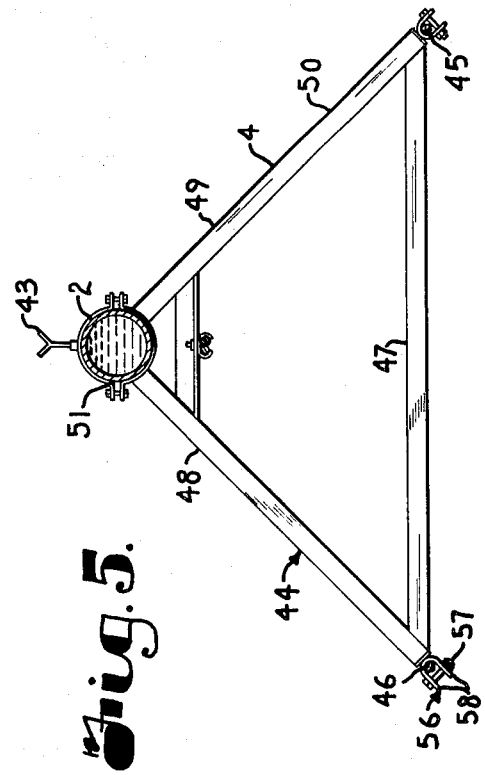
INVENTOR.
BENJAMIN R. NEIER
BY
Fishburn, Gold & Litman
ATTORNEYS

MOBILE UNIT FOR SELF-PROPELLED IRRIGATION SYSTEMS

This invention relates to self-propelled irrigation systems and more particularly to a mobile unit for such irrigation systems.

The principal objects of the present invention are: to provide a novel mobile unit for self-propelled irrigation systems having a plurality of similar mobile units wherein the irrigation system is radially extendible and contractible; to provide such a mobile unit having a novel truss structure supporting an irrigation pipe extending transversely from one side of a mobile frame; to provide such a mobile unit wherein the irrigation pipe is cambered or bowed upwardly to resist the weight of an irrigation fluid moving therethrough; to provide such a mobile unit having a slip or expansion joint permitting the mobile unit to travel over uneven terrain and to precede or trail adjacent mobile units; to provide such a slip joint in such a mobile unit wherein the mobile unit may move toward and away from adjacent mobile unit may move toward and away from adjacent mobile units thereby shortening or lengthening the irrigation system; to provide such a mobile unit having a slip joint pipe having one end movably received in the slip or expansion joint and extending transversely from the other side of the mobile unit and movement limiting means extending between the other end of the slip joint pipe and the other side of the mobile frame for maintaining the one end of the slip joint pipe within the slip or expansion joint; and to provide such a mobile unit which is economical to manufacture, easily maintained, simple to operate, positive and efficient in operation, and particularly well adapted for the proposed use.

Other objects and advantages of this invention will become apparent from the following description taken in connection with the accompanying drawings wherein are set forth by way of illustration and example certain embodiments of this invention.

FIG. 1 is a front elevational view of a mobile unit, embodying features of the present invention, for use in self-propelled irrigation systems having a plurality of similar units with portions of adjacent units shown in broken lines.

FIG. 2 is a side elevational view of the mobile unit.

FIG. 3 is a fragmentary perspective view of the drive means for the mobile unit.

FIG. 4 is an enlarged fragmentary sectional view taken on line 4–4, FIG. 1, showing a movement permitting expansion joint means.

FIG. 5 is a transverse sectional view taken on line 5–5, FIG. 1, showing a center truss frame.

FIG. 6 is an enlarged fragmentary sectional view taken on line 6–6, FIG. 1, showing a frame clamp on ends of intermediate truss frames.

FIG. 7 is an enlarged fragmentary sectional view taken on line 7–7, FIG. 1, showing a frame clamp on ends of end truss frames.

FIG. 8 is an enlarged fragmentary sectional view taken on line 8–8, FIG. 1, showing a truss rod connector clamp.

Referring more in detail to the drawings:

The reference numeral 1 generally designates a mobile unit for use in self-propelled irrigation systems having a plurality of similar mobile units radially spaced along and supporting an elongate irrigation pipe 2 which is connected to a central water supply pipe (not shown) wherein the mobile units are driven to move the irrigation pipe 2 in an area to be irrigated either in a straight line or around the central supply pipe (not shown) as an axis.

Each mobile unit 1 has a mobile frame 3 supporting the elongate irrigation pipe 2 extending transversely from one side of the mobile frame 3 and supported by a truss structure 4. An elongate slip joint pipe 5' has one end movably received in a slip or expansion joint 6 and extends transversely from the other side of the mobile frame 3. The other end of the slip joint pipe 5' is connected to an adjacent mobile unit 1' whereby the mobile unit 1 may move relative to adjacent mobile units 1' on each side thereof. Movement limiting means 7 extend between the other end of the slip joint pipe 5' and the other side of the mobile frame 3 for maintaining the one end of the slip joint pipe 5' within the slip or expansion joint 6.

The mobile frame 3 has a substantially triangular unit frame 8 which has an elongate base member 9 and elongate side members 10 and 11. The base member 9 is substantially parallel with a ground surface 12 traveled by the mobile unit 1 and the side members 10 and 11 each have one end connected to and extend upwardly from the opposite ends of the base member 9 and are joined together at their other or upper ends with the slip or expansion joint 6 mounted at the upper ends of the side members 10 and 11 or adjacent the apex of the triangle formed by base member 9 and the side members 10 and 11. A pair of longitudinally spaced yokes 14 and 15 are mounted on opposite ends of the base member 9 and depend therefrom. The yokes 14 and 15 each have ground engaging elements 16 and 17 respectively rotatably mounted therein.

In the illustrated structure, the yokes 14 and 15 each have a web portion 18 suitably secured to the base member 9, as by bolts 19, and spaced legs 20 and 21 extending downwardly from opposite edges of the web portion 18. The ground engaging elements 16 and 17 are illustrated as wheels each having an axle 22 rotatably mounted in lower edge portions 23 of the legs 20 and 21, as by suitable bearings 24.

Drive means including a suitable motor, is operatively connected to the ground engaging elements 16 and 17 for driving the mobile unit 1. While the motor may be electric, in the illustrated structure, it is hydraulic and the hydraulic motor 25 receives fluid under pressure from a suitable source, such as a motor driven pump, (not shown). The motor 25 is operative to rotate a drive shaft 26 having a pair of spaced drive gears 27 and 28 mounted thereon intermediate the ends thereof. Suitable power transmitting members, such as endless chains 29 and 30, engage the drive gears 27 and 28 respectively and are operative to rotate sprockets 31 and 32 mounted on shafts 33 and 34 rotatably mounted in the yokes 14 and 15 respectively, as by bearings 35 mounted in the legs 20 and 21 of the respective yokes 14 and 15. A sprocket 36 is mounted on each of the shafts 33 and 34 intermediate the ends thereof and is positioned to have the teeth of the sprocket 36 enter circumferentially spaced recesses 37 in the periphery or rim 38 of the respective wheels 16 and 17 whereby the mobile unit 1 is driven by the hydraulic motor 25.

The irrigation pipe 2 has one end mounted on one side of the unit frame 3 and extends transversely therefrom and in the illustrated structure, the irrigation pipe 2 has a plurality of pipe sections 39 each having a flange 40 at opposite ends thereof and the pipe sections 39 are joined together by a plurality of suitable fastening devices, such as bolts 41, extending through the flanges 40 on adjacent pipe sections 39. Bolts 42 mount the flange 40 at the one end of the irrigation pipe 2 to the one side of the unit frame 3. Each irrigation pipe section 39 has at least one suitable sprinkler head 43 mounted therein for distributing the irrigation fluid, such as water or water and selected chemicals, over the ground surface 12 traveled by the mobile unit 1.

The irrigation pipe 2 and the truss structure 4 supporting same are each on one side of the mobile unit 1 and the truss structure 4 includes a plurality of elongate truss frames 44 mounted on the irrigation pipe sections 39 and depending therefrom. The truss frames 44 are longitudinally spaced along the irrigation pipe 2 and each is substantially parallel with the triangular unit frame 8. The truss frames 44 are engaged by tension members 45 and 46 at opposite ends thereof. The tension members 45 and 46 each have one end mounted on the one side of the unit frame 8 and engage each of the truss frames 44 at the opposed ends thereof. The other ends of the tension members 45 and 46 are mounted on a slip joint pipe 5 of the mobile unit 1, as later described.

The truss frames 44 are each illustrated as substantially triangular shaped structures each having an elongate base member 47 which is positioned substantially parallel with the ground surface 12 and side members 48 and 49 each of which have one end connected to opposite ends of the base member 47 and extend upwardly therefrom to join at a connection to the respective pipe sections 39 whereby the pipe sections are at the apex of a triangle formed by the base member 47 and the side members 48 and 49.

It is preferred to use standard lengths of pipe and the number of pipe sections may vary according to the spacing between the mobile frames 3 and preferably use either three or four pipe sections. In the illustrated mobile unit, there are three pipe sections 39 with a center truss frame 30 suitably mounted on the center pipe section 39, as by a pipe clamp 51 bolted on the center pipe section intermediate the ends thereof. End truss frames 52 are similarly mounted on the end pipe sections 39 intermediate the ends thereof, as by pipe clamps 53. Intermediate truss frames 54 each have the apex thereof bolted to the end flanges 40 of the center pipe section 39.

The tension members 45 and 46 are illustrated as a plurality of elongate rod sections wherein a center rod section 55 engages a respective U-shaped rod keeper 56 positioned at opposite ends of the center frame 50 and is suitably retained therein, as by a bolt 57 extending through legs 58 of the U-shaped keeper 56. Opposite end portions of each center rod section 55 are mounted in respective frame clamps 59 on opposite ends of the base member 47 of the intermediate truss frames 54. The frame clamps 59 each have a substantially U-shaped fixed member 60 mounted on opposite ends of the intermediate truss frames 54 and a substantially U-shaped adjustable member 61 adapted to retain a respective end portion of the center rod section 55 and an adjacent overlapping end portion of an end rod section 62. Bolts 63 extend through the U-shaped fixed member 60 and the U-shaped adjustable member 61 whereby the adjustable member 61 is moved toward the fixed member 60 to retain the respective overlapping end portions of the rod sections 55 and 62 in clamping engagement therebetween. Each end rod section 62 engages a respective rod keeper 64 on opposite ends of the end truss frames 52 and is suitable retained therein, as by a bolt 65 extending through legs 66 of the respective rod keeper 64. The other end of the end rod section 62 is clampingly engaged in a respective rod connector clamp 67. The rod connector clamps 67 are similar to the frame clamps 59 and each have U-shaped adjustable sections 68 and 69 which are movable toward each other by tightening bolts 70 to clampingly engage an end portion of an end rod section 62 and an end portion of a mounting rod 71. A pair of the mounting rods 71 are mounted on the one side of the unit frame 8 and a pair of the mounting rods 71 at the other end of the truss structure 4 are mounted on a flange 72 of a slip joint pipe 5 to complete the truss structure.

Irrigation fluid within the irrigation pipe sections 39 tends to deflect same downwardly thereby tilting the unit frame 8 toward the one side having the one end of the irrigation pipe 2 mounted thereon. It is, therefore, desirable to adjust the tension members 45 and 46 to camber or upwardly bow the irrigation pipe 2 while same is empty to thereby resist downward deflection under weight of the irrigation fluid. This is accomplished by adjusting the end portions of the center rod sections 55 and the end rod sections 62 in the respective frame clamps 59 and the rod connector clamps 67.

It is also desirable to provide additional bracing members 73 extending between the unit frame 8 and the end pipe section 39 to assist in maintaining the mobile frame in a substantially upright position. In the illustrated structure, the bracing members 73 each have a lower end mounted at one of the opposite ends of the base member 9 of the unit frame 8 and an upper end mounted on opposite sides of a pipe clamp 74 positioned adjacent the pipe clamp 53 having the end frame 52 depending therefrom.

The pipe clamp 74 has upper and lower clamping portions 75 and 76 respectively held in clamping engagement with the pipe 3, by bolts 77. Arms 78 extend outwardly from one of the clamping portions, preferably the lower clamping portion 76 and each arm 78 has a bore therein to receive the upper end of the respective bracing member 73. The upper ends of the bracing members 73 are threaded to receive suitable tightening devices, such as nuts 79, positioned on opposite sides of each of the arms 78 whereby the bracing members 73 are adjustable to conform to the camber in the irrigation pipe 3.

The self-propelled irrigation system travels over uneven terrain, therefore, it is necessary for the slip or expansion joint 6 to permit relative movement between adjacent mobile units. The slope of the terrain may cause one mobile unit to tend to travel faster or slower than adjacent mobile units and the terrain may also cause one mobile unit to move radially toward or away from adjacent mobile units. The slip or expansion joint 6 is particularly adapted to permit relative movement between adjacent mobile units and to permit extension or contraction of the irrigation system.

The illustrated slip or expansion joint 6 is formed by an elongate tubular sleeve member 80 mounted adjacent the apex of the unit frame 8 and the sleeve member 80 has one end communicating with the irrigation pipe 2 and one end of the slip joint pipe 5 is movably received therein. Suitable fluid tight closure means engage the other side of the unit frame 8 and an exterior surface of the slip joint pipe 5 to thereby permit movement of the slip joint pipe relative to the unit frame 8 while maintaining the irrigation fluid within the respective pipes. In the illustrated structure, a collar 81 is suitably mounted on the other side of the unit frame 8 in an aligned relation with the other end of the sleeve member 80, as by a plurality of circumferentially spaced bolts 82. Fluidtight seal means, such as a rubber lip seal member 83, is mounted in the collar 81 and adapted to engage the exterior surface of the slip joint pipe 5'. The flange 72' on the other end of the slip joint pipe 5' is adapted to have the mounting rods 71' of an adjacent mobile unit 1' mounted thereon to complete a truss structure 4' thereof.

It is necessary to maintain the one end of the slip joint pipe 5' within the sleeve member 80 while permitting relative movement between the mobile unit 1 and adjacent mobile units 1'. Therefore, suitable movement limiting means is mounted on the other side of the unit frame 8 and is engageable with the flange 72' on the other end of the slip joint pipe 5' and the movement limiting means is illustrated as an elongate bar or rod 84 having one end pivotally mounted on the other side of the unit frame 8 and the other end thereof extending through the flange 72' whereby the flange may move relative to longitudinally spaced abutment members 85 and 86 mounted on the bar or rod 84 and positioned on opposite sides of the flange 72'. An arm 87 is suitably mounted on the other side of the unit frame 8, as by welding, and extends outwardly therefrom to receive a pivot pin or bolt 88 extending through the one end of the bar or rod 84 and one end of a clevis bar 89 mounted on the bar or rod 84 and positioned to have the arm 87 between the bar or rod 84 and the clevis bar 89. The abutment members 85 and 86 are illustrated as removable mounted bolts and nuts whereby the slip joint pipe 5' may be easily mounted in the sleeve member 80.

The mobile unit 1 is particularly adaptable for use in self-propelled irrigation systems having a plurality of similar mobile units wherein the mobile units travel over uneven terrain which results in adjacent mobile units being at different relative levels and traveling at different relative speeds whereby the mobile unit 1 may lead or trail adjacent mobile units 1'. The slip or expansion joint 6 permits this relative movement while the bar or rod 84 maintains the one end of the slip joint pipe 5' within the sleeve member 80.

It is to be understood that while I have illustrated and described one form of my invention it is not to be limited to the specific form or arrangement of parts herein described and shown

I claim:

1. A mobile unit for self-propelled irrigation systems having a plurality of mobile units, each of said mobile units comprising:

a. an elongate unit frame having a flow passage extending transversely therethrough;
b. a pair of longitudinally spaced ground engaging elements;
c. a pair of longitudinally spaced yokes mounted on said unit frame and each of said yokes engaging one of said ground engaging elements;
d. a first elongate irrigation pipe having one end fixed to said unit frame and extending transversely outwardly from one side thereof, said pipe being in communication with said flow passage in said unit frame;
e. a second irrigation pipe having one end communicating with said flow passage and extending outwardly relative the unit frame in opposed relation to said first irrigation pipe;
f. means on said unit frame movable supporting said one end of the second irrigation pipe and providing a liquid seal therewith for flow of liquid from one pipe to the other;
g. means connected to the unit frame and said second irrigation pipe to limit relative movement thereof;
h. elongate truss means for supporting said first irrigation pipe; and
i. drive means operatively engaged with said ground engaging elements for driving the mobile unit.

2. The mobile unit as set forth in claim 1 wherein:
a. said flow passage is an elongate tubular sleeve member mounted in said unit frame, said tubular sleeve member being larger in diameter than said first and second irrigation pipes, said second irrigation pipe having said one end extending into said sleeve member; and
b. said means supporting said one end of the second irrigation pipe being closure means engaging said other side of said unit frame in liquid tight relation and having a resilient seal member engaging an exterior surface of said second irrigation pipe for permitting endwise and swinging movement of said second irrigation pipe relative to said unit frame.

3. A mobile unit for self-propelled irrigation systems having a plurality of mobile units, each mobile unit comprising:
a. a substantially triangular unit frame having an elongate base member and elongate side members;
b. a yoke mounted on each end of said base members and depending therefrom;
c. a wheel rotatably mounted on each of said yokes;
d. an elongate sleeve member mounted in an apex of said unit frame and extending transversely thereof and forming a liquid passage;
e. a first elongate irrigation pipe extending transversely from one side of said unit frame, said irrigation pipe having one end fixed in liquid tight relation to said unit frame at said apex thereof in communication with one end of said sleeve member;
f. a collar mounted on an other side of said unit frame in an aligned liquidtight relation with an other end of said sleeve member;
g. a second irrigation pipe having an end portion received within said other end of said sleeve member for swinging and endwise movement relative thereto;
h. fluid tight seal means mounted in said collar and engaging an exterior surface of said end portion of the second irrigation pipe;
i. connector means on said second irrigation pipe spaced from said unit frame;
j. rod means pivotally connected relative to the unit frame and having spaced stops engageable with the connector means in response to endwise movement of the second irrigation pipe toward and away from the unit frame to limit said endwise movement while permitting swinging movement of said second irrigation pipe;
k. truss means below said first irrigation pipe and connected thereto with one end of said truss means connected to said unit frame for supporting said first irrigation pipe; and
l. drive means operatively engaged with each of said wheels for driving the mobile unit.

4. A mobile unit for self-propelled irrigation systems having a plurality of mobile units, each of said mobile units comprising:
a. an elongate unit frame;
b. a pair of longitudinally spaced ground engaging elements;
c. a pair elements; longitudinally spaced yokes mounted on said unit frame and each of said yokes engaging one of said ground engaging elements;
d. an elongate irrigation pipe mounted on and extending transversely from one side of said unit frame;
e. an elongate slip joint pipe movably received within said unit frame and extending transversely from the other side of said unit frame;
f. means for maintaining said slip joint pipe within said unit frame;
g. elongate truss means for supporting said first irrigation pipe including a plurality of elongate truss frames mounted on said first irrigation pipe, said truss frames being substantially parallel with said unit frame and spaced along said first irrigation pipe, a pair of elongate tension members supported at opposite ends of each of said truss frames, one end of each of said tension members being connected to said one side of said unit frame, the other end of each of said tension members being positioned to be connected to a slip joint pipe of an adjacent mobile unit in the irrigation system; and
h. drive means operatively engaged with said ground engaging elements for driving the mobile unit.

5. The mobile unit as set forth in claim 4 including:
a. a pipe clamp mounted on said irrigation pipe intermediate the ends thereof; and
b. a pair of elongate bracing members each having one end mounted on said pipe clamp and the other end thereof mounted on said unit frame.

6. The mobile unit as set forth in claim 4, wherein:
a. said truss frames are each substantially triangular shaped structures each having an elongate base member and elongate side members;
b. said irrigation pipe engages said triangular truss frames at the apex thereof; and
c. said tension members engage said truss frames at opposite ends of said base member whereby said truss means is positioned below said irrigation pipe.

7. The mobile unit as set forth in claim 6, wherein:
a. said tension members are elongate truss rods;
b. said truss rods each have a plurality of rod sections which have end portions positioned in overlying adjustable relation whereby said irrigation pipe can be upwardly bowed while empty to resist downward deflection under weight of irrigation fluid.